(12) United States Patent
Pires et al.

(10) Patent No.: US 10,973,312 B2
(45) Date of Patent: Apr. 13, 2021

(54) APPLICATION ELEMENT FOR AN APPLICATOR

(71) Applicant: ZEN DESIGN SOLUTIONS LIMITED, Kowloon (HK)

(72) Inventors: Leo Clifford Pires, Basking Ridge, NJ (US); Roger Hwang, Maple (CA); Smita Srivastava, New Delhi (IN); Rahul Bose, New Delhi (IN)

(73) Assignee: ZEN DESIGN SOLUTIONS LIMITED, Kowloon (HK)

( * ) Notice: Subject to any disclaimer, the term of this patent is extended or adjusted under 35 U.S.C. 154(b) by 276 days.

(21) Appl. No.: 15/478,084

(22) Filed: Apr. 3, 2017

(65) Prior Publication Data

US 2017/0290412 A1 Oct. 12, 2017

(30) Foreign Application Priority Data

Apr. 8, 2016 (IN) .............................. 201611012397

(51) Int. Cl.
| | | |
|---|---|---|
| *A46B 9/02* | (2006.01) | |
| *A46B 9/04* | (2006.01) | |
| *A46B 3/00* | (2006.01) | |
| *A46B 9/00* | (2006.01) | |
| *B29C 45/34* | (2006.01) | |
| *B29L 31/42* | (2006.01) | |
| *B29C 45/26* | (2006.01) | |

(52) U.S. Cl.
CPC .............. *A46B 9/028* (2013.01); *A46B 3/005* (2013.01); *A46B 9/005* (2013.01); *A46B 9/021* (2013.01); *A46B 9/04* (2013.01); *B29C 45/34* (2013.01); *A46B 2200/1053* (2013.01); *A46B 2200/1066* (2013.01); *A46B 2200/207* (2013.01); *A46B 2200/30* (2013.01); *B29C 45/2626* (2013.01); *B29L 2031/42* (2013.01)

(58) Field of Classification Search
CPC .. A45D 34/045; A45D 40/262; A45D 40/267; A45D 34/043; A45D 34/042; A46B 2200/1053; A46B 2200/106; A46B 2200/1066; A46B 3/005; A46B 3/02; A46B 3/18; A46B 9/005; A46B 9/021; A46B 9/028; A46B 9/026; A46B 3/04; A46B 2200/1046
USPC .................................. 132/218; D4/131, 134
See application file for complete search history.

(56) References Cited

U.S. PATENT DOCUMENTS

| | | |
|---|---|---|
| 4,561,456 A | 12/1985 | Gueret |
| 4,635,659 A | 1/1987 | Spatz |

(Continued)

FOREIGN PATENT DOCUMENTS

| | | | |
|---|---|---|---|
| WO | WO 2010013213 | * | 7/2009 |
| WO | WO 2016071489 | * | 5/2016 |

*Primary Examiner* — Yogesh P Patel
*Assistant Examiner* — Jennifer Gill
(74) *Attorney, Agent, or Firm* — Patterson + Sheridan, LLP (57) ABSTRACT

An application element and an applicator comprising pluralities of said application elements on a molded support is provided for applying a product such as a cosmetic, a medicinal or a care product. At least one application element of the applicator includes a base portion and at least one thin projection. The thin projection includes at least one surface and wherein the at least one outer surface flushes with at least a portion of an outer surface of the base portion.

10 Claims, 9 Drawing Sheets

(56) References Cited

U.S. PATENT DOCUMENTS

| | | | |
|---|---|---|---|
| 6,412,496 B1* | 7/2002 | Gueret | A45D 40/267 |
| | | | 132/218 |
| 6,539,950 B1* | 4/2003 | Gueret | A45D 40/267 |
| | | | 132/218 |
| 6,581,610 B1* | 6/2003 | Gueret | A45D 40/267 |
| | | | 132/218 |
| 6,616,366 B1 | 9/2003 | Weihrauch | |
| 7,121,284 B2 | 10/2006 | Gueret | |
| 8,568,049 B2* | 10/2013 | Kulik | A45D 40/262 |
| | | | 401/126 |
| 8,794,247 B2 | 8/2014 | Kulik | |
| 9,532,642 B2* | 1/2017 | Zech | A46B 3/005 |
| 2002/0174877 A1* | 11/2002 | Gueret | A45D 40/267 |
| | | | 132/218 |
| 2003/0163884 A1† | 9/2003 | Weihrauch | |
| 2005/0034740 A1 | 2/2005 | Eckers et al. | |
| 2005/0160546 A1* | 7/2005 | Weihrauch | A46B 15/001 |
| | | | 15/207.2 |
| 2007/0062552 A1* | 3/2007 | De Brouwer | A45D 34/045 |
| | | | 132/218 |
| 2009/0255077 A1* | 10/2009 | Mori | A46B 9/028 |
| | | | 15/167.1 |
| 2011/0164914 A1* | 7/2011 | Caulier | A46B 3/18 |
| | | | 401/129 |
| 2012/0103361 A1* | 5/2012 | Geuther | A45D 40/26 |
| | | | 132/218 |

\* cited by examiner
† cited by third party

APPLICATION ELEMENT FOR AN APPLICATOR

CROSS-REFERENCE TO RELATED APPLICATION

This application claims benefit of Indian Provisional Application Ser. No. 201611012397, filed on Apr. 8, 2016, which is incorporated by reference in its entirety.

BACKGROUND

Field of the Invention

Embodiments of the present disclosure relate to an applicator for applying a product such as a cosmetic, a medicinal or a care product. More particularly, the disclosure relates to an application element for the applicator, in particular a cosmetic applicator, toothbrush or a cleaning applicator and a method of producing the application elements.

Description of the Related Art

Varied forms of application elements, especially bristles used in combination with applicators such as mascara brushes, toothbrushes and cleaning brushes are known. By way of example, bristles for a mascara brush are described below. The invention is however not limited thereto.

Conventional mascara brush for applying mascara to the eyelashes comprises relatively long tufts of bristles arranged in rings or a helix around a core formed by twisted iron wire. A typical mascara applicator comprises a plurality of bristles mounted to a helically twisted wire. These cosmetic applicators have many drawbacks. First of all, they can be relatively dangerous by reason of the presence of a sharp and rigid element such as iron wire which is capable of injuring the eyes. Furthermore, these brushes comprise a considerable number of bristles which entangle the eyelashes, and the bristles have hardness generally unsuitable for lashes. To prevent allergic reactions to the user, the applicator brush should contain no metal.

Recently, to eliminate the disadvantages of twisted applicator brushes molded rubber or plastic mascara brush designs have also been proposed, as disclosed in U.S. Pat. Nos. 4,635,659; 6,616,366; 4,561,456; and 7,121,284; as well as in U.S. Patent Pub. No. US 2005/0034740. The brush of these types has plastic injection molded support and application elements such as tines. Attempts were made to improve the combing effect of these mascara brushes by giving the individual tines sufficiently large mutual separations. However, this caused the amount of mascara accepted in the spaces between the tines to be insufficient. If the tines are disposed at smaller mutual separations, a sufficient amount of mascara can be received, however, the combing effect is inadequate, since the eyelashes and hair cannot or can only insufficiently penetrate between the tines. The prior art tries to increase the reception capacity for mascara by profiling the tines. This slightly reduces the above-mentioned problems but does not eliminate them completely.

Further, the type, size, disposition and other characteristics of the tines determine how well the brush performs its desired function. For example, U.S. Pat. No. 4,561,456 discloses an applicator having application elements in form of tines that have smooth side surfaces and free ends that form hooks, and U.S. Pat. No. 8,794,247 discloses mascara applicator with application elements having at least one undulation.

It is the underlying purpose of the present invention to produce an innovative structure of an application element of an applicator which overcomes above mentioned drawbacks. The present disclosure proposes to provide an applicator with application elements allowing a better separation of the individual eyelashes to be obtained, and application of homogeneous layer of a product.

SUMMARY

The present disclosure relates to an application element and an applicator comprising pluralities of said application elements on a molded support, wherein the application element includes a thin projection. The thin projection according to an embodiment is at a distal portion of the application element. The application element is used for a cosmetic applicator, hygiene brushes, e.g. toothbrushes, cleaning brushes in the medical field or in hospitals or also as cleaning or application brushes in the food industry. More particularly, the cosmetic applicator is a mascara applicator.

According to an embodiment of present disclosure, the applicator is a molded brush having a proximal end and a distal end, and wherein the proximal end of the applicator is configured in the conventional manner for disposing the applicator on a stem. For example, the proximal end of the applicator may be attached to a stem by any conventional means, such as but not limited to, snap-fit, complimentary screw threads and the like. Moreover, a handling unit, for example a screw-on cap of a cosmetics unit is disposed on the stem.

According to another aspect of present disclosure, the applicator has a longitudinal axis and said pluralities of application elements extend outward from the molded support of the applicator. According to another aspect of present disclosure, the application elements are molded integrally with the support and extend perpendicularly to the longitudinal axis of the applicator. However, it is not beyond the ambit of the present disclosure that the application elements may extend non-perpendicularly to the support.

According to another aspect of present disclosure, the application elements are in form of tines.

According to an embodiment of the present disclosure, the application elements may be selected from a group consisting of bristles, tines, teeth, and disc.

According to another aspect of the present disclosure, the application element further includes a base portion and at least one thin projection extending from said base portion of the application element.

According to a preferred embodiment, the application element has a D-shaped cross section over at least a major part of its length. However, it is within ambit of the present disclosure that the cross section of the application element may be any other cross-section known in the art. For example, the application element may have a circular or a non-circular cross-section selected from a square cross-section, a rectangular cross section, a triangular cross section, a pentagon cross section, or a hexagonal cross section. Similarly, it will be apparent to a person having ordinary skill in the art that the base portion of the application element may have one of a straight shape or a curved shape. For example, it is possible to use application elements with the base portion presenting a conical shape with a flat side, a curved conical shape, an inverted L-shape, a Y-shape, a T-shape, an inverted U-shape, a key hole-shape, or a base portion having two bends.

According to another aspect of the present disclosure, the D-shaped application element comprises a base portion having a central longitudinal axis and wherein the base portion of the D-shaped application element includes a flat sidewall. Further, an outer surface presented by the flat side wall of the base portion flush with a portion of an outer surface of the thin projection such that the thin projection is positioned off-centered with respect to the central longitudinal axis of the base portion of the application element. In other words, the thin projection and the base portion share a common sidewall.

According to a preferred embodiment of the present disclosure, the thin projection includes a flat sidewall and the flat sidewall of the thin projection flushes with the flat sidewall of the base portion providing a smooth, continuous transition from the base portion to the thin projection.

According to yet another preferred embodiment of the disclosure, the width of the thin projection may range between 0.05 mm-0.2 mm and height may range between 0.1 mm-2.0 mm. In a more preferred embodiment, the width of thin projection ranges between 0.08 mm-0.15 mm and the height of the thin projection is 0.5 mm. The thin projections on application elements such as on tines of a mascara brush, with such dimensions enable the tines to get between the closest eyelashes creating a highly separated fan of eyelashes. The thin projections also create drag and pull eyelashes upwards resulting in curling of eyelashes.

According to another aspect of the disclosure, the application element along its length has a tapering envelope or in alternate embodiments, at least the base portion has a tapering envelope. However, it is within the ambit of present disclosure that the application element may not have a tapering envelope surface.

According to another aspect of the present disclosure, the application element presents a smooth depression free continuous outer surface. According to an alternate embodiment of the present disclosure, the outer surface of the application element may include a texture or a profiling such as grooves at least on the base portion.

According to an embodiment of the disclosure, the height/total length L of the application element may range between 0.5 mm-6.0 mm and wherein the base portion has a height/length between 0.4 mm-5.9 mm. The maximum width of the base portion may be between 0.3 mm-0.6 mm. However, in alternate embodiments, the maximum width of the base portion may be greater than 0.6 mm.

According to a preferred embodiment of the present disclosure, the thin projection extends in a direction parallel to the longitudinal axis of the base portion of the application element. However in various other variants of the application element, the thin projection may not extend in direction parallel to the longitudinal axis of the base portion of the application element. For example, the variants of the application element of the present invention may include one or more thin projections extending laterally from a side wall of the base portion.

According to another aspect of present disclosure, the application elements are arranged on the support in parallel rows and wherein the rows extend along the longitudinal axis of the support. According to another embodiment, the application elements may be arranged on the support in non-parallel rows. In an alternate embodiment, the application elements may be arranged in helical rows around the support. For molding the application elements, it is possible to use a thermoplastic material e.g. styrene-ethylene-butadiene-styrene (SEBS), a silicone, latex, butyl rubber, ethylene-propylene-terpolymer rubber (EDPM), a nitrile rubber, a thermoplastic elastomer, a polyester elastomer, polyamide, polyethylene, or vinyl elastomer, a polyolefin such as polyethylene (PE) or polypropylene (PP), polyvinyl chloride (PVC), ethylene vinyl acetate copolymer (EVA), polystyrene (PS), polyethylene terephthalate (PET), polyacetal (POM), polyamide (PA), or polymethyl methacrylate (PMMA). In particular, it is possible to use the materials known under the trademarks Hytrel®, Cariflex®, Alixine®, Santoprene®, Pebax®, this list not being limiting. In other embodiments, it is possible that at least one of the support or the application elements may be constructed in whole or in part of materials including, but not limited to, ceramic, glass, metal (e.g., carbon steel, stainless steel, aluminum, chrome, copper, nickel, or titanium), or composite material.

It will be apparent to a person having ordinary skill in the art that the molded support may present a cross-section that is circular or non-circular over a major fraction of its length. For example, in alternate embodiments of the present disclosure, over at least a fraction of its length, the molded support may present a cross-section selected from the following list: circular; semi-circular; flat; elliptical; oblong; semi-elliptical; polygonal; triangular; rectangular; square; pentagonal; hexagonal; heptagonal; octagonal; and semi-polygonal. In a variant embodiment of the present disclosure, the cross-sectional shape may vary along the central longitudinal axis of the support. Further, the molded support may be rectilinear or curved.

According to an embodiment of the present disclosure, at least a portion of the application elements may be flocked.

According to alternate embodiments of the present disclosure, the applicator may comprise at least two different types of application elements, such as application elements with and without thin projections on them.

According to present disclosure, the applicator is manufactured by an injection molding process and wherein the application elements are integrally molded with the support and is made from the same plastic/material in which the molded support is made. However, the molded support is relatively rigid because of the thicker cross-section and larger dimensions whereas, the integral application elements, although made from the same material but because of the thinner cross section and relatively smaller dimensions are comparatively flexible. The method of manufacturing of the application element by injection-molding will now be described. Injection-molding is understood to be molding of a component by injecting a material in the fluid state under super-atmospheric pressure into a volume which is closed apart from the injection orifice defined by the mold.

According to another aspect of present disclosure, an injection mold is provided; the injection mold includes a cavity corresponding to the molded support and a plurality of subsequent molding channel cavities corresponding to the base portion of application elements of the present disclosure. Further, the injection mold comprises two halves namely a first plate and a second plate and wherein, the first plate mates with the second plate to form the injection mold. The first plate and the second plate interiorly define at least one injection port, air vents, and said mold cavities. When the plates mate and align properly, the injection port provides an entrance for the conduction of the material into the mold cavities. Further, each of the air vents communicates with at least one molding channel cavity, wherein the air vents provide an exit to allow entrapped air to escape from the mold. The size and design of air vents of the injection mold of the present disclosure is different from the conventional injection. More particularly, only the front ends of air vents (the ends close to cavities for application elements) are different from the air vents of the conventional injection mold in terms of shape and size. Preferably, the injection mold of the present disclosure may be obtained from the conventional injection mold by modifying shape of only the front ends of the air vents. The conventional air vents are permeable to air but are impermeable to the molten material and has opening of 0.02 mm approximately whereas the front end of air vents of the present disclosure has an opening of >0.02 mm at their front ends and wherein the shape and size of the front ends of the air vents may be selected corresponding to desired shape and size of the thin projections. The opening provided by front end of the air vents of the present disclosure allows melt to enter the front end of the air vents during injection molding to produce thin projections at free end portion of the application elements.

According to another aspect of present disclosure, the air vent gradually decreases to size of a conventional air vent on moving away from the front end portion of the air vent towards a middle portion of the air vent. During feeding of a melt, the melt enters into the mold through the injection port and fills the mold cavities thereby forming the support integral with the base portion of application elements and, due to high pressure, also enters front end portion of the air vents to produce thin projections on the application elements. The molding channels cavities and air vents in the mold may have a cross-sectional shape corresponding to a desired shape of the application elements and thin projections respectively. Finally, the injection mold is cooled and opened to release the injection molded applicator when it has achieved sufficient shape stability.

According to an alternate embodiment of the disclosure, the molded support and the application elements of the applicator of the present disclosure are each fabricated from materials having different properties, using bi-injection or a multi injection molding technique. According to one embodiment of the disclosure, the application elements are fabricated from a material which is softer than a material from which the molded support is fabricated. It is also contemplated that the material of the application elements may be harder than the material of molded support. The different materials of the molded support and the application elements may have properties that are attractive and non-attractive to mascara, have different stiffness, have different tactile feel, have different color, have different chemical nature, have different magnetic property, have different temperature property and/or other property.

According to an alternate embodiment, the applicator includes at least two applicator parts that are coupled to one another and wherein one of the at least two applicator parts includes a molded support and pluralities of application elements. The at least two applicator parts are each fabricated from materials having different properties At least one of the applicator parts is manufactured by an injection molding process and wherein the application elements are integrally molded with the support.

While there have been described what are at present considered to be the preferred embodiments of this disclosure, it will be obvious to those skilled in the art that various changes and modifications may be made without departing from the disclosure and it is therefore, aimed to cover all such changes and modifications that fall within the true spirit and scope of the disclosure.

These and further aspects which will be apparent to the expert of the art are attained by an applicator in accordance with the drawings of the present disclosure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 22 illustrates a front view of an applicator element according to a second embodiment of the present disclosure;

FIGS. 23 to 34 are different examples of the placement of thin projections on the application elements;

To facilitate understanding, identical reference numerals have been used, where possible, to designate identical elements that are common to the figures.

DETAILED DESCRIPTION

Figure 1:
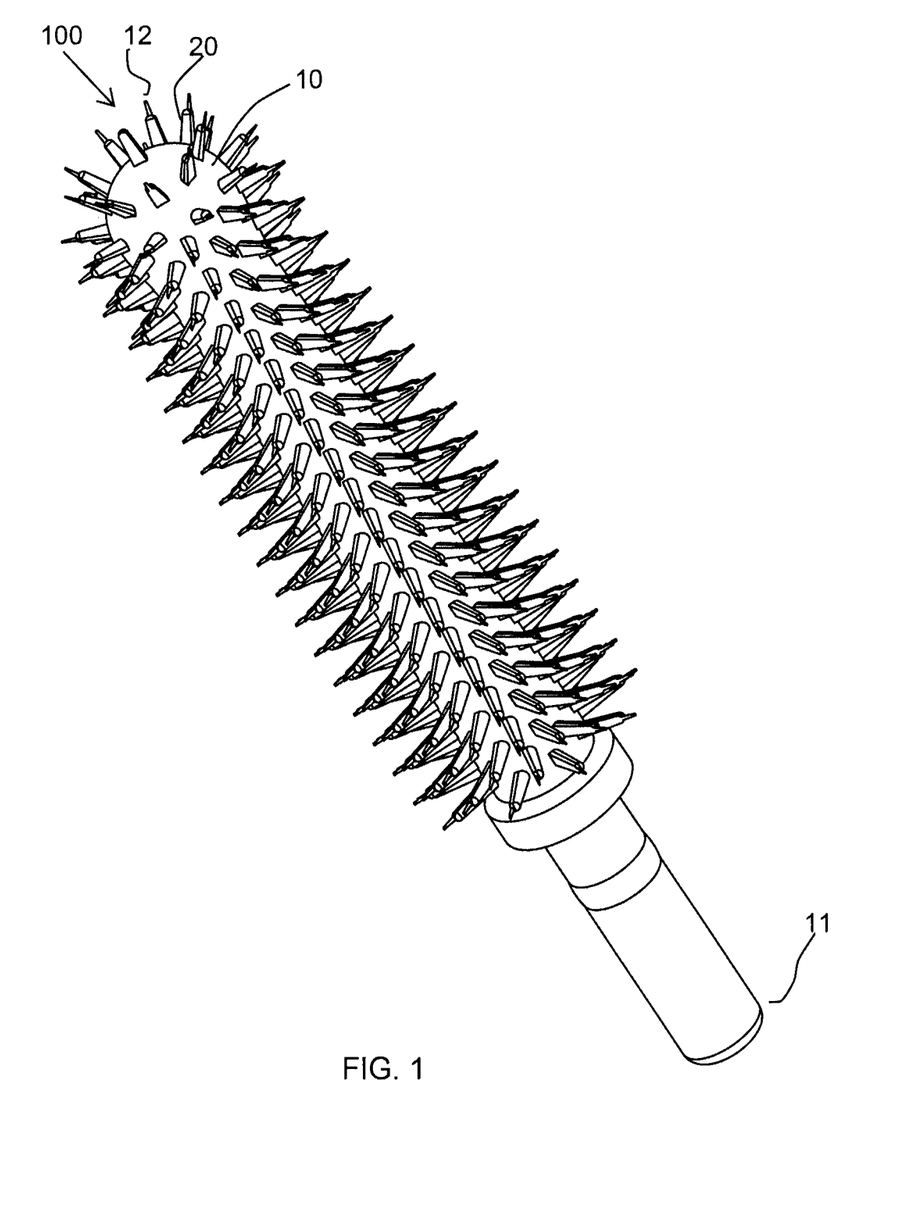
FIG. 1 illustrates a perspective view of an applicator according to one embodiment of the disclosure.
Figure 2:
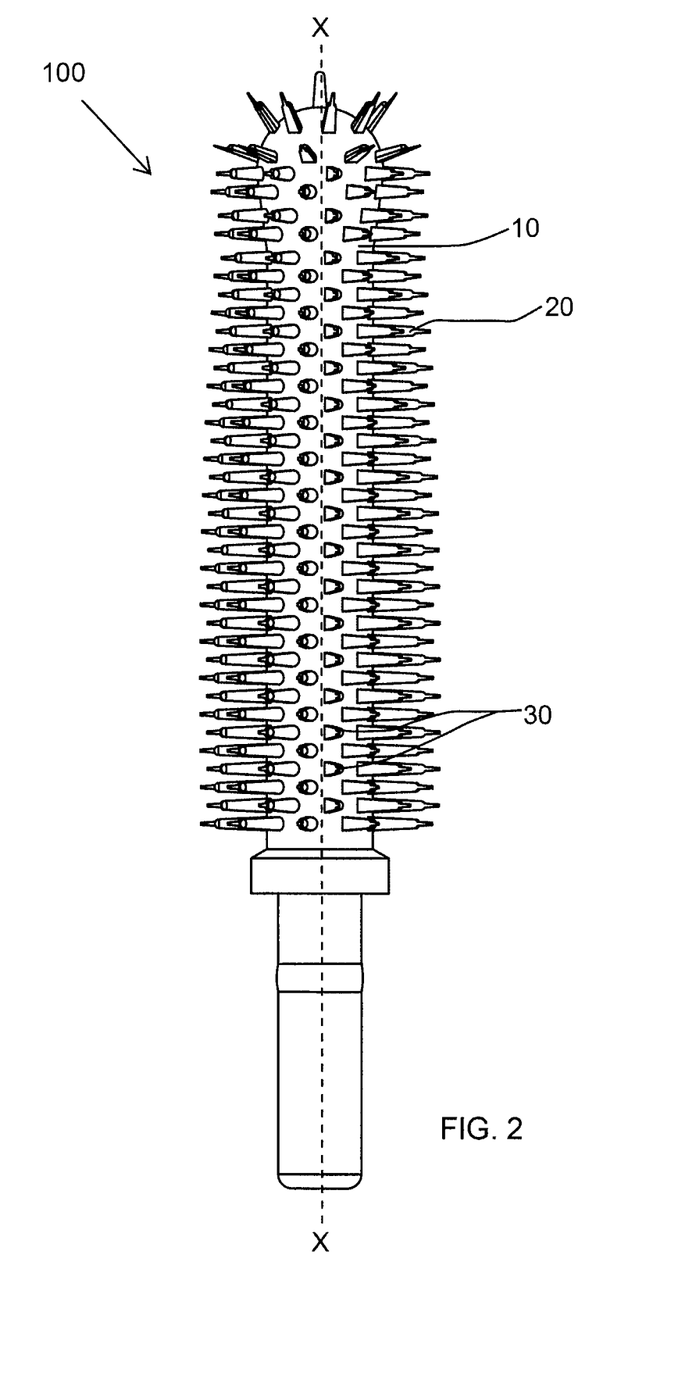
FIG. 2 illustrates a front view of the applicator of FIG. 1.

FIGS. 1 and 2 illustrate an applicator 100 according to one embodiment of the present disclosure. As shown, the applicator 100 is a molded brush having a proximal end 11 and a distal end 12, and comprises a molded support 10. According to an aspect of the present disclosure, the proximal end 11 of the applicator 100 is configured in a conventional manner for disposing the applicator 100 on a stem (not shown). For example, the proximal end 11 of the applicator 100 may be attached to a stem by any conventional means, such as but not limited to, snap-fit, complimentary screw threads and the like. Moreover, a handling unit, for example a screw-on cap of a cosmetics unit (not shown) may be disposed on the stem.

The applicator 100 further includes a plurality of application elements 20 extending outward from the molded support 10. The application elements 20 are molded integrally with the support 10 and extend perpendicularly to a central longitudinal axis X-X of the molded support 10. However, it is not beyond the ambit of the present disclosure that the application elements 20 may extend non-perpendicularly to the central longitudinal axis X-X of the support 10. As shown in the FIG. 2, the application elements 20 are in form of tines. In other embodiments, the application elements may be selected from a group consisting of bristles, tines, teeth, and disc.

Furthermore, the application elements 20 are arranged on the support 10 in parallel rows 30 and wherein the rows 30 extend along the longitudinal axis X-X of the support 10. In alternate embodiments, the application elements 20 may be arranged on the support 10 in non-parallel rows. For example, the application elements may be arranged in helical rows around the molded support.

Figure 3:
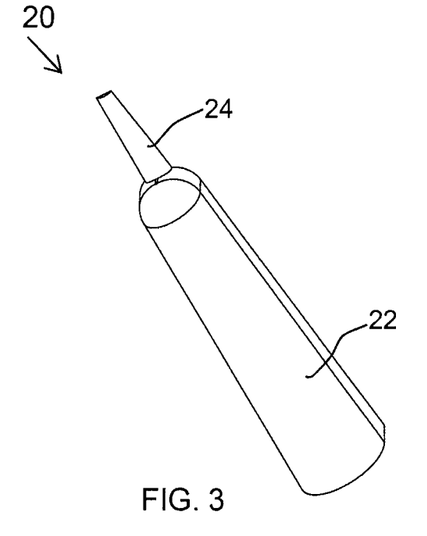
FIG. 3 illustrates a perspective view of an application element of the cosmetic applicator of FIG. 1.

Referring now to FIG. 3, an individual application element 20 of the applicator 100 is shown in isolation and wherein the applicator 100 is a cosmetic applicator, particularly a mascara applicator. It is within the ambit of present disclosure that the individual application element 20 can be used in particular for hygiene brushes, e.g. toothbrushes, cleaning brushes in the medical field or in hospitals or also as cleaning or application brushes in the food industry.

Figure 6:
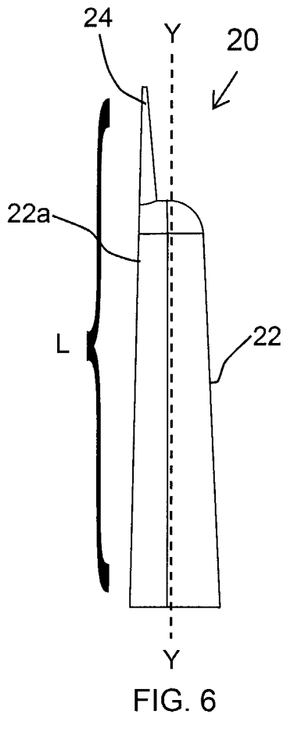
FIG. 6 illustrates a side view of the application element of FIG. 3.

As shown in FIG. 6, the application element 20 includes a base portion 22 extending along a longitudinal axis Y-Y and at least one thin projection 24 at a distal end of the base portion 22. The application element 20 has a total length L. Along its total length L, the application element 20 has a tapering enveloping surface or at least the base portion 22 has a tapering envelope. However, it is within the ambit of present disclosure that the application element 20 may not have a tapering envelope surface.

Figure 4:
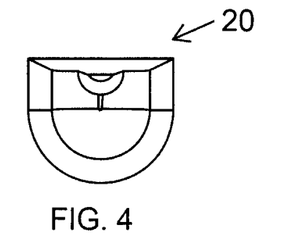
FIG. 4 illustrates a top view of the application element of FIG. 3.
Figure 5:
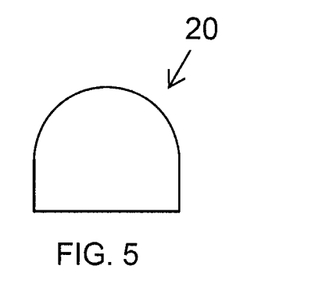
FIG. 5 illustrates a bottom view of the application element of FIG. 3.
Figure 9:
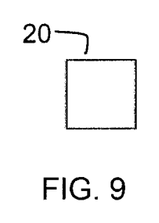
FIGS. 9 to 13 are diagrammatic cross-section views of different examples of the application element that may be used, amongst others.
Figure 10:
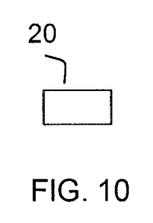
Figure 11:
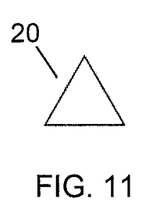
Figure 12:
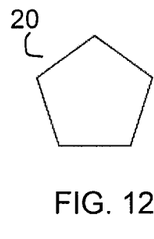
Figure 13:
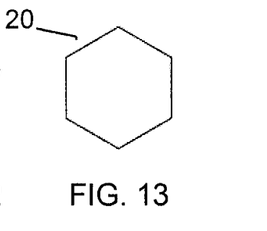

According to an aspect of the present disclosure, as shown in the FIGS. 4 & 5, the application element 20 has a D-shaped cross section over at least a major part of its length. However, it is within ambit of the present disclosure that the cross section of the application element 20 may be any other cross-section known in the art. For example, application element 20 may have any circular or non-circular cross sections shown in FIGS. 9 to 13 but not limited to these examples, a square cross-section shown in FIG. 9, a rectangular cross section shown in FIG. 10, a triangular cross section shown in FIG. 11, a pentagon cross section shown in FIG. 12, and a hexagonal cross section shown in FIG. 13.

Figure 14:
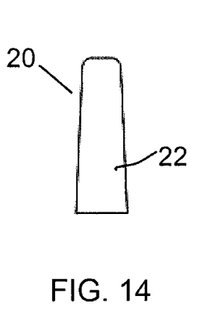
FIGS. 14 to 21 are different examples of the shapes of the application element that may be used, with thin projections not shown on the application elements.
Figure 15:
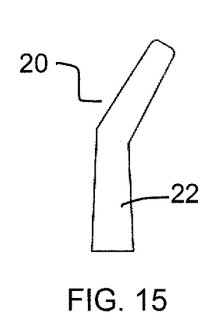
Figure 16:
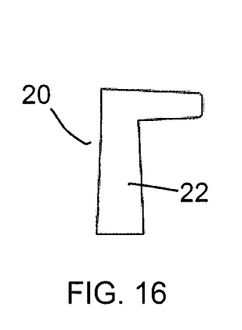
Figure 17:
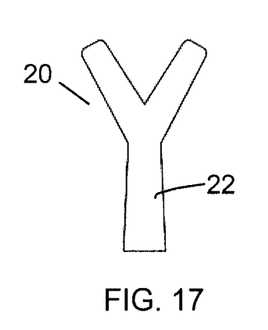
Figure 18:
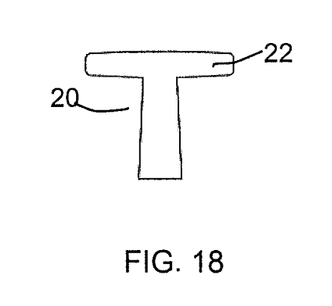
Figure 19:
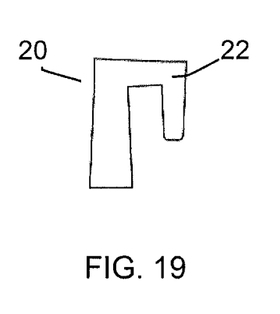
Figure 20:
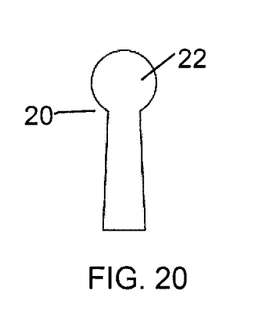
Figure 21:
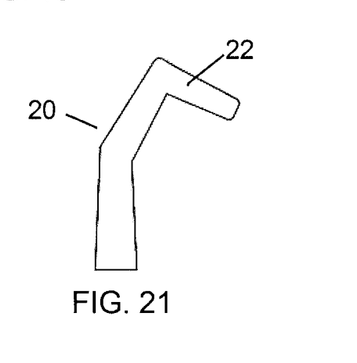

Similarly, it will be apparent to a person having ordinary skill in the art that the application element 20, particularly the base portion 22 of the application element 20 may have one of a straight cylindrical shape or a curved cylindrical shape, a straight conical shape or a curved conical shape, a straight frusto-conical shape or a curved frusto-conical shape, a straight prismatic shape or a curved prismatic shape and any other shape known in the art. For example, it is possible to use application elements with the base portion 22 presenting one of the shapes shown in FIGS. 14 to 21 in a diagrammatic manner, for example a conical shape with a flat side as shown in FIG. 14, a bent conical shape as shown in FIG. 15, inverted L-shape in FIG. 16, Y-shape as shown in FIG. 17, T-shape as shown in FIG. 18, inverted U-shape as shown in FIG. 19, key hole-shape as shown in FIG. 20, or a base portion 22 having two bends as shown in FIG. 21.

According to another aspect of the present disclosure, the application element 20 presents a smooth depression free continuous outer surface. According to an alternate embodiment of the present disclosure, the outer surface of the application element 20 may include a texture or a profiling such as grooves at least on the base portion 22.

Figure 7:
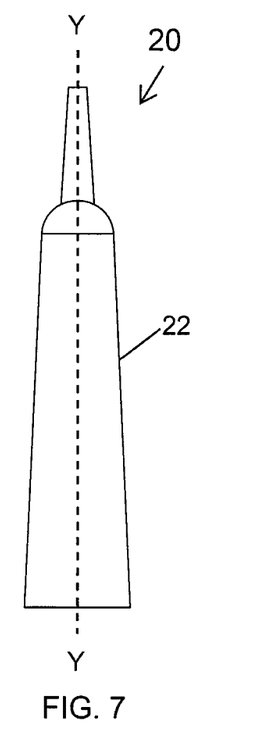
FIG. 7 illustrates a front view of the application element of FIG. 3.
Figure 8:
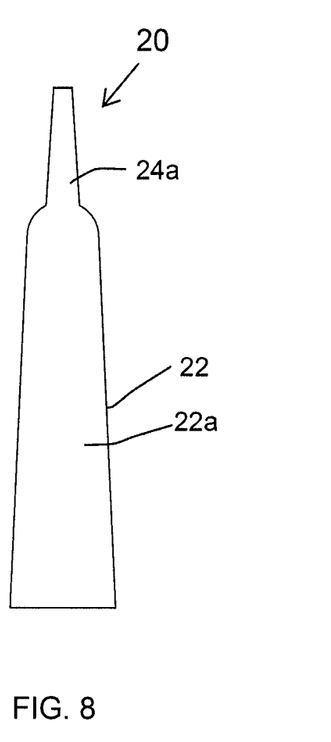
FIG. 8 illustrates a back view of the application element of FIG. 3.

According to another aspect of the present disclosure, as shown in FIGS. 6 through 8, the D-shaped application element 20 includes at least one flat sidewall 22a. A part of an outer surface of the thin projection 24 flush with an outer surface presented by the flat side wall 22a of the base portion 22 such that the thin projection 24 is positioned off-centered with respect to a central longitudinal axis Y-Y of the base portion 22 of the application element 20. In other words, the thin projection 24 and the base portion 22 share a common sidewall and does not lie on the central longitudinal axis Y-Y of the base portion 22.

According to a preferred embodiment of the disclosure, the width of the thin projection 24 may range between 0.05 mm-0.20 mm and height may range between 0, 1 mm-2.0 mm. In a more preferred embodiment, the width of thin projection 24 ranges between 0.08 mm-0.15 mm and the height of the thin projection is 0.5 mm. The thin projections 24 on application elements such as on tines of a mascara brush, with such dimensions enable the tines to get between the closest eyelashes creating a highly separated fan. The thin projections also create drag and pull eyelashes upwards resulting in curling of eyelashes.

According to a preferred embodiment of the disclosure, the height/total length L of the application element 20 may range between 0.5 mm-6.0 mm and wherein the base portion 22 has a height/length between 0.4 mm-5.9 mm. The maximum width of the base portion 22 may be between 0.3 mm-0.6 mm. However, in alternate embodiments, the maximum width of the base portion may be greater than 0.6 mm.

According to a preferred embodiment of the present disclosure, the thin projection 24 includes a flat sidewall 24a and wherein the flat sidewall 24a flushes with flat sidewall 22a of the base portion 22 providing a smooth, continuous transition from the base portion 22 to the thin projection 24, as shown in FIG. 6.

Figures 22, 23, 24:
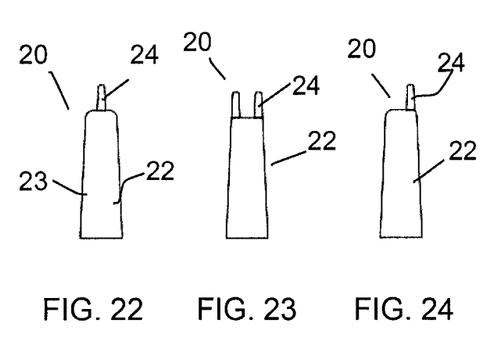
Figure 22A:
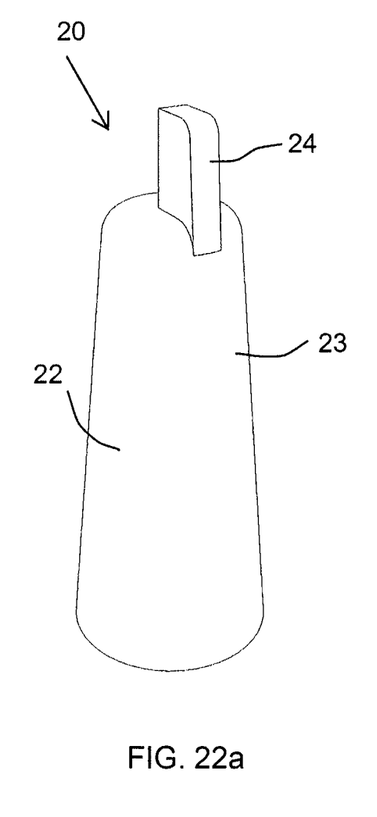
FIG. 22*a* illustrates a perspective view of the applicator element of FIG. 22.
Figure 22B:
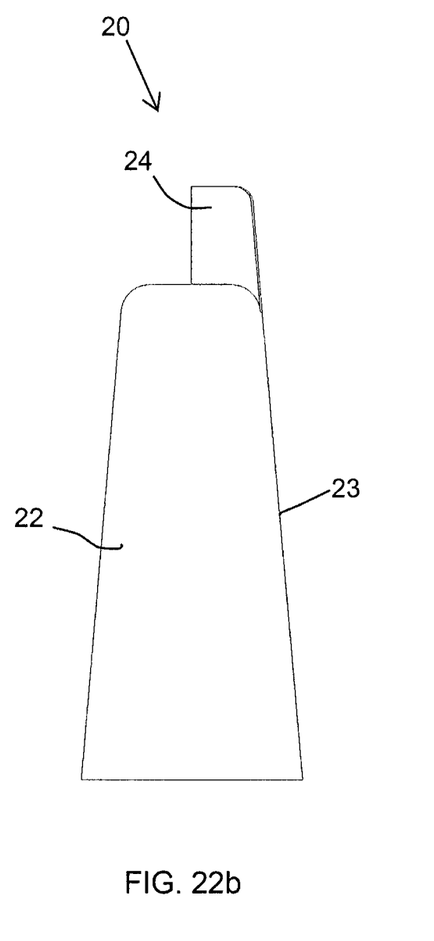
FIG. 22*b* illustrates a side view of the applicator element of FIG. 22.

According to an alternate embodiment of the present disclosure, as shown in FIGS. 22, 22a, and 22b, the application element 20 includes a conical base portion 22 having an outer surface 23, and at least a portion of the outer surface of thin projection 24 is in continuation with at least a part of outer surface 23 of the base portion 22 such that the thin projection 24.

Figures 25, 26:
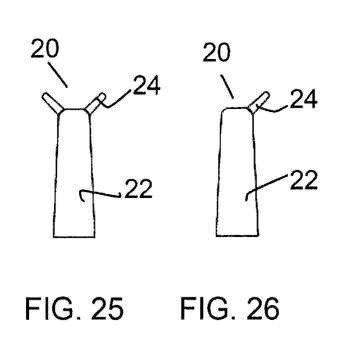
Figures 27, 28, 29:
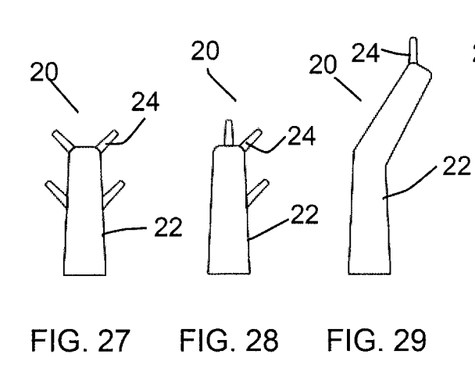
Figure 31:
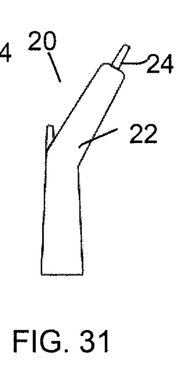
Figure 32:
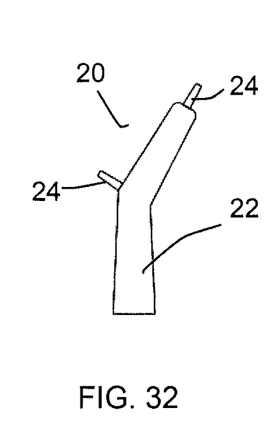
Figure 33:
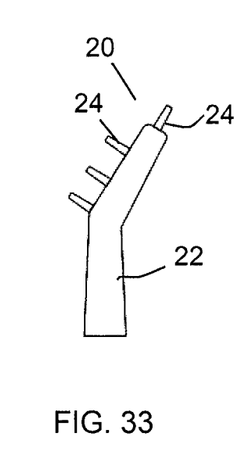
Figure 34:
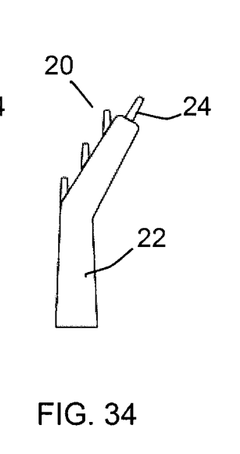

According to a preferred embodiment of the present disclosure, the thin projection 24 extends in a direction parallel to the central longitudinal axis Y-Y of the base portion 22 of the application element 20 as shown in FIG. 6 of the present embodiment, and in other variants shown in FIGS. 22, 23, 24, 30, and 31. However in various other variants of the application element, the thin projection 24 may not extend in direction parallel to the central longitudinal axis Y-Y of the base portion 22, as shown in FIGS. 25, 26, &27. The variants of the application element of the present invention may include at least one thin projection 24 that extends in a direction parallel to the central longitudinal axis Y-Y, and at least one thin projection 24 that does extend parallel to the central longitudinal axis Y-Y of the base portion 22, as shown in FIGS. 28, 29, 32, 33, and 34.

According to another aspect of present disclosure, the longitudinal axis X-X at least in the exemplary embodiment according to FIG. 2 is the axis of symmetry of the applicator 100.

It will be apparent to a person having ordinary skill in the art that the support 10 may present a cross-section that is circular or non-circular over a major fraction of its length. For example, in alternate embodiments of the present disclosure, over at least a fraction of its length, the support 10 may present a cross-section selected from the following list: circular; semi-circular; flat; elliptical; oblong; semi-elliptical; polygonal; triangular; rectangular; square; pentagonal; hexagonal; heptagonal; octagonal; and semi-polygonal. In a variant embodiment of the present disclosure, the cross-sectional shape may vary along the central longitudinal axis X-X of the support 10.

For molding the application elements 20, it is possible to use a thermoplastic material e.g. styrene-ethylene-butadiene-styrene (SEBS), a silicone, latex, butyl rubber, ethylene-propylene-terpolymer rubber (EDPM), a nitrile rubber, a thermoplastic elastomer, a polyester elastomer, polyamide, polyethylene, or vinyl elastomer, a polyolefin such as polyethylene (PE) or polypropylene (PP), polyvinyl chloride (PVC), ethylene vinyl acetate copolymer (EVA), polystyrene (PS), polyethylene terephthalate (PET), polyacetal (POM), polyamide (PA), or polymethyl methacrylate (PMMA). In particular, it is possible to use the materials known under the trademarks Hytrel®, Cariflex®, Alixine®, Santoprene®, Pebax®, this list not being limiting. In other embodiments, it is possible that at least one of the support 10 or the application elements 20 may be constructed in whole or in part of materials including, but not limited to ceramic, glass, metal (e.g., carbon steel, stainless steel, aluminum, chrome, copper, nickel, or titanium), or composite material.

According to present disclosure, the applicator 100 is manufactured by an injection molding process and wherein the application elements 20 are integrally molded with the support 10 and is made from the same plastic/material in which support 10 is made. However, the molded support 10 is relatively rigid because of the thicker cross-section and larger dimensions whereas, the integral application elements 20, although made from the same material but because of the thinner cross section and relatively smaller dimensions are comparatively flexible. The method of manufacturing of the application element 20 by injection-molding will now be described.

Figure 35:
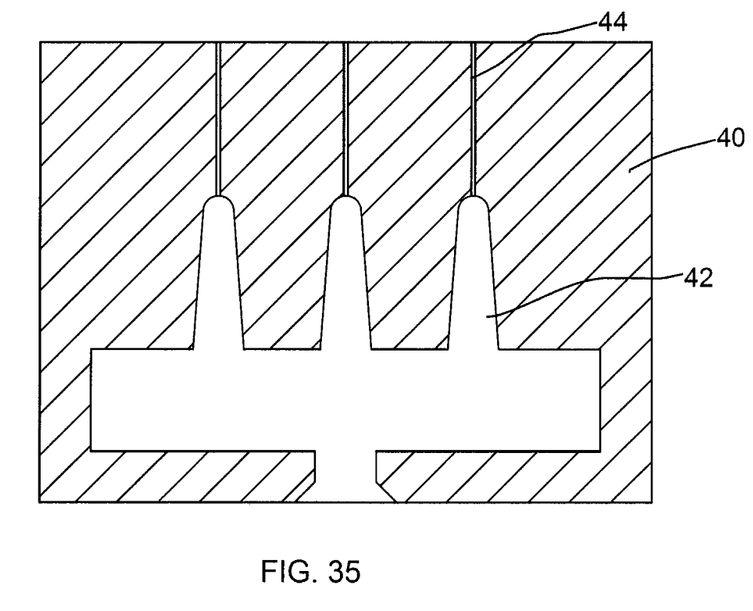
FIG. 35 illustrates a sectional view of a conventional injection mold.
Figure 36:
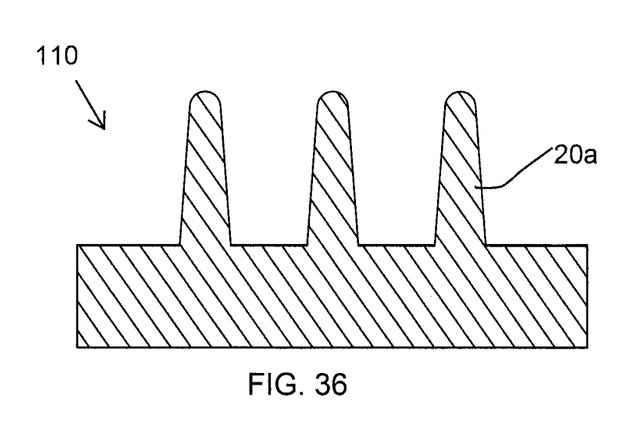
FIG. 36 illustrates a sectional view of a conventional applicator obtained using the injection mold of FIG. 35.

Injection-molding is understood to be molding of a component by injecting a material in the fluid state under super-atmospheric pressure into a volume which is closed apart from the injection orifice defined by the mold. Referring to FIG. 35, a conventional injection mold 40 is shown which is used for manufacturing a cosmetic applicator 110 of FIG. 36. The conventional injection mold 40 is provided with cavities 42 corresponding to application elements 20a and at least one outlet for the air such as a very thin or thin bore or tube capable of forming an air vent 44. The air vents 44 are located in correspondence with the tips of the applicator elements 20a where the air could be trapped. The air vents 44 are permeable to air but are impermeable to the plastics material as the air vents 44 has spacing between one wall and the other of 0.02 mm approximately.

Figure 37:
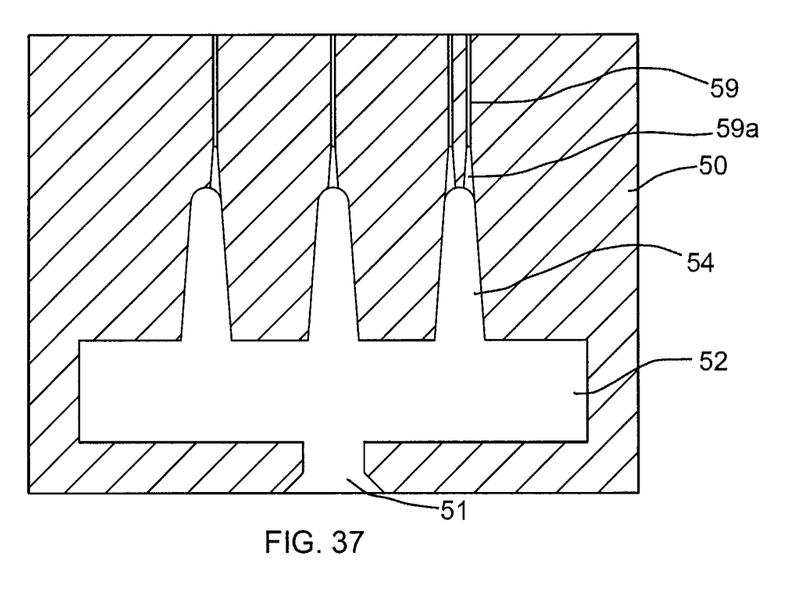
FIG. 37 illustrates a sectional view of an injection mold according to an embodiment of the present disclosure.
Figure 38:
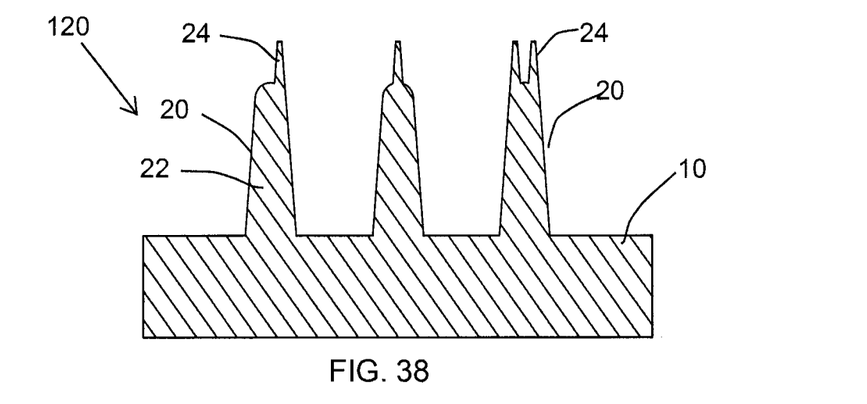
FIG. 38 illustrates a sectional view of an applicator obtained using the injection mold of FIG. 37.
Figure 39:
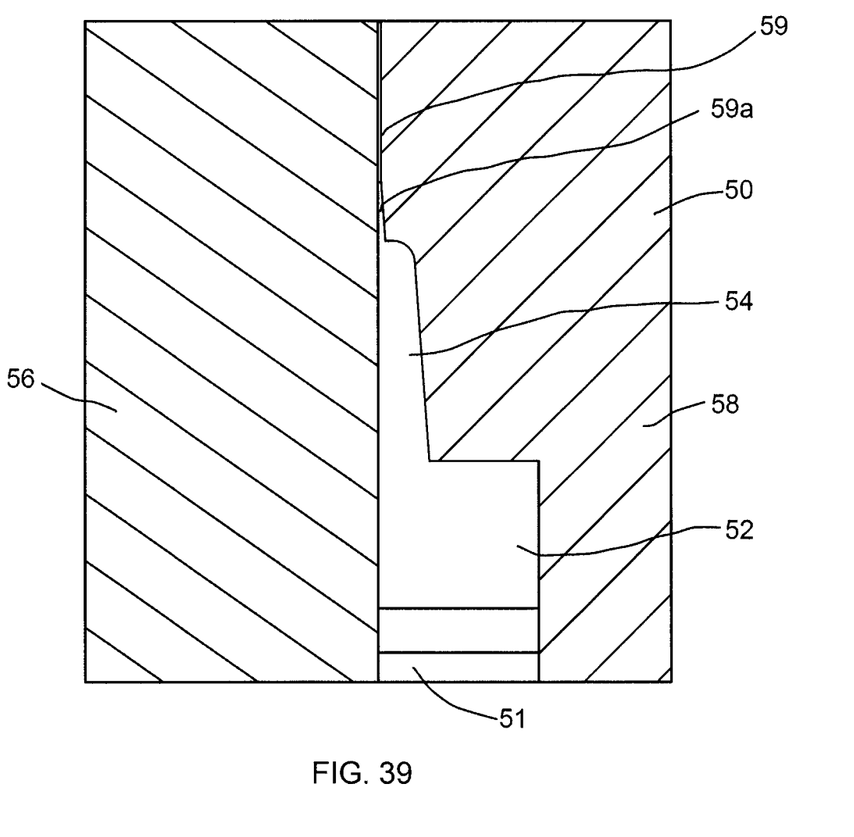
FIG. 39 illustrates another sectional view of the injection mold of FIG. 37.

Referring now to the drawings and particularly to FIGS. 37 and 39, schematically illustrated is an injection mold 50 of present disclosure provided in only such detail as will be required for an understanding of the disclosure, the details of construction of which other than the particular dies used, being conventional, are not illustrated. In the embodiment as illustrated in FIG. 38, an applicator 120 is shown comprising a molded support 10 and application elements 20 having thin projection 24, the applicator is produced using the injection mold 50.

Referring to FIGS. 37-39, the molded support 10 and the application elements 20 are produced in an injection mold 50 having a cavity 52 corresponding to the molded support 10 and a plurality of subsequent molding channel cavities 54 corresponding to the base portion 22 of application elements 20. As shown in FIG. 39, the injection mold 50 comprises two halves namely a first plate 56 and a second plate 58. The first plate 56 mates with the second plate 58 to form the injection mold 50. The first plate 56 and the second plate 58 interiorly define at least one injection port 51, air vents 59, and mold cavities 52, 54. When the plates 56, 58 mate and align properly, the injection port 51 provides an entrance for the conduction of the thermoplastic material into the mold cavities 52, 54. The series of air vents 59, communicate with at least one molding channel cavity 54. The air vents 59 are formed to provide an exit to allow entrapped air to escape from the mold 50.

The injection mold 50 is different from the conventional injection mold 40 in terms of size and design of air vents in the injection mold 50. More particularly, only the front ends 59a of air vents 59 are different from the air vents 44 of the conventional mold 40 in terms of its shape and size. The conventional air vents 44 are permeable to air but are impermeable to the plastics material and has opening of 0.02 mm approximately whereas the front end 59a of air vents 59 of the present disclosure are bigger in size as compared to conventional air vents 44 and has an opening of >0.02 mm. The opening provided by front end 59a of the air vents 59 allows molten material to enter the front end 59a of the air vents 59 during injection molding to produce thin projections 24 at free end portion of the application elements 20. The injection mold 50 may be obtained from the conventional injection mold by modifying only the front ends of the air vent 44. The shape and size of the front end of the air vents may be selected corresponding to desired shape and size of the thin projections. As shown in FIG. 37, the air vent 59 gradually decreases in size from its front end 59a to a size of a conventional air vent.

During feeding of the melt, the melt enters into the cavity 52 through the injection port 51 and fills the entire longitudinal molding channels cavities 54 forming the support 10 integral with the base portion 22 of application elements 20 and, due to high pressure, also enters front end portion 59a of the air vents 59 to produce thin projections 24. The molding channels cavities 54 and the front ends 59a of the air vents 59 in the mold 50 have a cross-sectional shape corresponding to a desired shape of the application elements 20 and thin projections 24 respectively. The injection mold 50 is cooled and opened to release the injection molded applicator when it has achieved sufficient shape stability.

According to an alternate embodiment of the disclosure, the molded support 10 and the application elements 20 of the cosmetic applicator 100 are each fabricated from materials having different properties, using bi-injection or a multi injection molding technique. According to one embodiment of the disclosure, the application elements 20 are fabricated from a material which is softer than a material from which the molded support 10 is fabricated. It is also contemplated that the material of the application elements 20 may be harder than the material of molded support 10. The different materials of the molded support 10 and the application elements 20 may have properties that are attractive and non-attractive to mascara, have different stiffness, have different tactile feel, have different color, have different chemical nature, have different magnetic property, have different temperature property and/or other property.

According to an alternate embodiment, the applicator includes at least two applicator parts that are coupled to one another and wherein one of the at least two applicator parts includes a molded support and pluralities of application elements. The at least two applicator parts are each fabricated from materials having different properties. At least one of the applicator parts is manufactured by an injection molding process and wherein the application elements are integrally molded with the support.

According to alternate embodiments of the present disclosure, the applicator 100 may comprise at least two different types of application elements, such as application elements with and without thin projections on them. According to an embodiment of the present disclosure, at least a portion of the application elements 20 may be flocked.

While there have been described what are at present considered to be the preferred embodiments of this disclosure, it will be obvious to those skilled in the art that various changes and modifications may be made without departing from the disclosure and it is therefore, aimed to cover all such changes and modifications that fall within the true spirit and scope of the disclosure.

What is claimed is:

1. An applicator comprising:
a molded support;
a plurality of application elements extending from the molded support in a plurality of longitudinal rows, each application element being similarly shaped;
wherein each application element of the plurality of application elements includes a base portion and a single thin projection extending from an arcuate distal end of the base portion;
wherein the arcuate distal end of the base portion is configured to contact with a human keratinous surface during application, wherein the thin projection has a width along its entire length that is less than half a width of the arcuate distal end;
wherein the base portion has a central longitudinal axis;
wherein the base portion and the thin projection both include one flat sidewall and one curved sidewall adjacent to the flat sidewall, wherein the one curved sidewall extends from a first side of the flat sidewall to a second side of the flat sidewall to form a D-shaped cross-section, wherein the flat sidewalls of the plurality of application elements of one row of the plurality of rows of application elements faces the curved sidewalls of the plurality of application elements of an adjacent row of the plurality of rows of application elements;
wherein the D-shaped cross section of the base portion has a larger area than the D-shaped cross section of a proximal end of the thin projection;
wherein a portion of an outer surface presented by the flat sidewall of the base portion flushes with an outer surface of the flat sidewall of the thin projection providing a smooth, continuous transition from the base portion to the thin projection; and
wherein the thin projection is off-centered with respect to the central longitudinal axis of the base portion; and
wherein the plurality of application elements within each row of the plurality of rows are equally spaced from each other.

2. The applicator according to claim 1, wherein the plurality of application elements is in tine form.

3. The applicator according to claim 1, wherein a width of the thin projection ranges between 0.05 mm 0.2 mm and a height of the thin projection ranges between 0.1 mm 2.0 mm.

4. The applicator according to claim 1, wherein the base portion has a length between 0.4 mm-5.9 mm, and a width between 0.3 mm-0.6 mm.

5. The applicator according to claim 1, wherein a width of the thin projection ranges between 0.08 mm-0.15 mm and a height of the thin projection is 0.5 mm.

6. The applicator according to claim 1 wherein the at least one application element has a total length ranging between 0.5 mm-6.0 mm.

7. The applicator according to claim 1, wherein the plurality of application elements is selected from a group consisting of bristles, teeth, and disc.

8. The applicator according to claim 1, wherein the plurality of application elements is molded integrally with the molded support.

9. The applicator according to claim 1, wherein the applicator is a molded brush having a proximal end and a distal end, and wherein the proximal end of the applicator is configured to be secured to a stem.

10. The applicator according to claim 1, wherein the base portion has a length at least three times a height of the thin projection.

* * * * *